US007430249B2

(12) United States Patent
Ohba et al.

(10) Patent No.: US 7,430,249 B2
(45) Date of Patent: Sep. 30, 2008

(54) CARRIER STATE JUDGING DEVICE AND TRANSMITTING DEVICE

(75) Inventors: Takeshi Ohba, Kawasaki (JP); Yasuhito Funyu, Kawasaki (JP); Hideharu Shako, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 69 days.

(21) Appl. No.: 11/546,910

(22) Filed: Oct. 13, 2006

(65) Prior Publication Data

US 2008/0003958 A1 Jan. 3, 2008

(30) Foreign Application Priority Data

Jun. 30, 2006 (JP) ............................ 2006-181601

(51) Int. Cl.
*H04L 25/49* (2006.01)

(52) U.S. Cl. ...................................... 375/296; 375/297

(58) Field of Classification Search ......... 375/295–297, 375/260, 299, 267, 130, 140, 144, 146; 455/91, 455/101; 370/208–210; 332/106, 107, 117, 332/123, 159, 149
See application file for complete search history.

(56) References Cited

U.S. PATENT DOCUMENTS

| | | | | |
|---|---|---|---|---|
| 6,864,745 B2 * | 3/2005 | Ode et al. | .................. | 330/149 |
| 2004/0212428 A1 * | 10/2004 | Ode et al. | .................. | 330/149 |
| 2005/0226346 A1 * | 10/2005 | Ode et al. | .................. | 375/296 |

FOREIGN PATENT DOCUMENTS

| | | |
|---|---|---|
| JP | 2002-305489 A | 10/2002 |

* cited by examiner

*Primary Examiner*—Tesfaldet Bocure
(74) *Attorney, Agent, or Firm*—Hanify & King, P.C.

(57) ABSTRACT

The present invention is a carrier state judging device having a multiplexing unit multiplexing carrier signals to be inputted in parallel, output control units inputted to the multiplexing unit and performing ON/OFF control of outputs of the carrier signals inputted to the output control units themselves according to predetermined ON/OFF setting values, frequency shift units and giving predetermined frequency shift quantities to the carrier signals inputted to the frequency shift units themselves, a detection unit detecting as to whether or not there is the carrier signal flowing through on each carrier signal transmission path, and a determining unit determining a state of the carrier signals multiplexed by the multiplexing unit on the basis of the ON/OFF setting value with respect to each of the output control units, the frequency shift quantity with respect to each of the frequency shift units and a result of the detection by the detection unit.

5 Claims, 21 Drawing Sheets

*FIG. 7*

<table>
<tr><th rowspan="2">NUMBER OF EFFECTIVE CARRIERS</th><th colspan="4">ON-STATE OF EACH CARRIER SETTING (FREQUENCY SHIFT QUANTITY [MHz] GIVEN IN ROUND BRACKETS)</th><th rowspan="2">CARRIER PATTERN NO.</th></tr>
<tr><th>C1 (-7.5)</th><th>C2 (-2.5)</th><th>C3 (+2.5)</th><th>C4 (+7.5)</th></tr>
<tr><td>4</td><td>○</td><td>○</td><td>○</td><td>○</td><td>PATTERN 1</td></tr>
<tr><td rowspan="4">3</td><td>○</td><td>○</td><td>○</td><td></td><td rowspan="2">PATTERN 2</td></tr>
<tr><td></td><td>○</td><td>○</td><td>○</td></tr>
<tr><td>○</td><td>○</td><td></td><td>○</td><td rowspan="2">PATTERN 3</td></tr>
<tr><td>○</td><td></td><td>○</td><td>○</td></tr>
<tr><td rowspan="6">2</td><td>○</td><td>○</td><td></td><td></td><td rowspan="3">PATTERN 4</td></tr>
<tr><td></td><td>○</td><td>○</td><td></td></tr>
<tr><td></td><td></td><td>○</td><td>○</td></tr>
<tr><td>○</td><td></td><td>○</td><td></td><td rowspan="2">PATTERN 5</td></tr>
<tr><td></td><td>○</td><td></td><td>○</td></tr>
<tr><td>○</td><td></td><td></td><td>○</td><td>PATTERN 6</td></tr>
<tr><td rowspan="4">1</td><td>○</td><td></td><td></td><td></td><td rowspan="4">PATTERN 7</td></tr>
<tr><td></td><td>○</td><td></td><td></td></tr>
<tr><td></td><td></td><td>○</td><td></td></tr>
<tr><td></td><td></td><td></td><td>○</td></tr>
</table>

FIG. 12

| CARRIER ON/OFF SETTING | ON | ON | OFF | OFF |
|---|---|---|---|---|
| INPUT AMPLITUDE | GIVEN | NOT GIVEN | GIVEN | NOT GIVEN |
| CARRIER OUTPUT | GIVEN | NOT GIVEN | NOT GIVEN | NOT GIVEN |

| CARRIER (FREQUENCY SHIFT QUANTITY [MHz]) | C1 (−7.5) | C2 (−2.5) | C3 (+2.5) | C4 (+7.5) |
|---|---|---|---|---|
| CARRIER ON/OFF SETTING | ON | ON | ON | ON |
| INPUT AMPLITUDE | GIVEN | GIVEN | NOT GIVEN | GIVEN |

CARRIER STATE JUDGING DEVICE AND TRANSMITTING DEVICE

BACKGROUND OF THE INVENTION

1. Technical Field

The present invention relates to distortion compensation in a transmission amplifying unit at a wireless station.

2. Background Art

A digital mobile communication system is exemplified by an access control system that involves employing a code division multiple access (CDMA) system. The CDMA system involves using a spectrum diffusion communication method, wherein signals of a plurality of users are multiplexed in a way that allocates a characteristic code per channel to each of the user's signals, and are transmitted via a wireless transmission path.

A W-CDMA (Wideband-CDMA) system is one of the third generation mobile phone communication systems. The W-CDMA system uses the CDMA system. Transmission data of the W-CDMA system are data having a peak. If this peak increases, distortion occurs in the signal due to nonlinearity of a power amplifier. This signal distortion leads to transmission of an unnecessary signal in a frequency adjacent to an allocated transmission frequency band, resulting in a cause of a cross talk. Therefore, such a process is required as to decrease an off-band Adjacent Channel Leakage power Ratio (ACLR) to the greatest possible degree. The transmitting device is required to conduct peak suppression and distortion compensation in order not to transmit the unnecessary signal.

FIG. 21 is a diagram showing an example of the transmitting device having a conventional distortion compensation function. FIG. 21 shows a case of providing four transmission carriers.

In FIG. 21, a transmitting device 9100 having the distortion compensation function includes a base band interface 9102, a peak suppression arithmetic unit 9104, a multiplier 9105, a filter 9106, a multiplier 9107, a carrier ON/OFF setting unit 9108, a frequency shift quantity setting unit 9109, an adder unit 9110, a multiplier 9111, a distortion compensation control unit 9118, a digital/analog converter (DAC) 9112, a modulator (MOD) 9114, a power amplifying unit (PA) 9116, an analog/digital converter (ADC) 9120, a demodulator (DEM) 9124, a numerically controlled oscillator (NCO) 9122, an FB signal storage memory 9126, a REF signal storage memory 9128 and a CPU 9150. Further, the transmitting device 9100 is connected to a host device 9200.

The base band interface 9102 applies CDMA modulation to the signal and outputs the signal to each carrier signal transmission path. Each carrier signal (code-multiplexed signal) outputted from the base band interface 9102 is multiplied, in the multiplier 9105, by a peak suppression value calculated in the peak suppression arithmetic unit 9104, and is inputted to the filter 9106 in order to undergo waveform-shaping.

The peak suppression arithmetic unit 9104 predicts what type of peak will occur and calculates the peak suppression value from the setting by the carrier ON/OFF setting unit 9108 and from the setting of the frequency shift quantity.

The signal, which is waveform-shaped by the filter 9106, is inputted to the carrier ON/OFF setting unit 9108. If the setting by the carrier ON/OFF setting unit 9108 shows "ON", the inputted signal is outputted as it is. Whereas if the setting by the carrier ON/OFF setting unit 9108 shows "OFF", the inputted signal is not outputted. The signal outputted from the carrier ON/OFF setting unit 9108 is shifted from a base band frequency by a frequency shift quantity that is set per carrier, and is inputted to the adder unit (multiplexing unit) 9110.

The adder unit 9110 adds (multiplexes) the signals of the respective carriers and outputs the multiplexed signal. The signal (multiplexed signal) outputted from the adder unit 9110 is multiplied in the multiplier 9111 by a distortion compensation value calculated in the distortion compensation control unit 9118, and is inputted to the DAC 9112. The DAC 9112 converts the inputted digital signal into an analog signal.

The analog signal converted by the DAC 9112 is modulated by the MOD 9114 into a transmission frequency.

The PA 9116 amplifies the signal modulated into the transmission frequency. The signal thereof is outputted from an antenna (unillustrated).

Further, the signal outputted from the PA 9116 is down-converted from the transmission frequency in order to undergo distortion-monitoring. The down-converted signal is converted by the ADC 9120 into the digital signal from the analog signal. The signal converted into the digital signal is demodulated by the DEM 9124 by use of the signal given from the NCO 9122, and is stored as an FB (feedback) signal in the FB signal storage memory 9126. Further, the signal outputted from the adder unit 9110 described above is stored as a REF (reference) signal in the REF signal storage memory 9128.

The distortion compensation control unit 9118 monitors the distortion by performing fast Fourier transform (FFT) on the basis of the fixed-period signals stored in the FB signal storage memory 9126 and in the REF signal storage memory 9128, and calculates the distortion compensation value that takes account of the distortion in the PA 9116. The multiplier 9111 multiplies this distortion compensation value by the signal before being amplified by the PA 9116, thereby making it possible to suppress the occurrence of the distortion of the signal to be outputted.

The transmitting device 9100 specifies a carrier pattern from carrier information obtained from the ON/OFF state of the carrier and from the setting of the carrier frequency shift quantity. The peak suppression setting and the setting of the distortion monitoring point for the distortion compensation are performed based on the information of this specified carrier pattern.

[Patent document 1] Japanese Patent Application Laid-Open Publication No.2002-305489

SUMMARY OF THE INVENTION

Disclosure of the Invention

Problems to be Solved by the Invention

The carrier pattern information obtained from the information on the setting of the carrier ON/OFF setting value and the setting of the carrier frequency shift quantity is not, however, information that takes account of whether or not there is an output of the carrier signal per carrier from the base band interface. Namely, with respect to a certain carrier, even if there is no output of the carrier signal from the base band interface, it has hitherto been deemed that the output is given from the carrier when the ON/OFF setting value of this carrier indicates "ON". At this time, it follows that the carrier state of the actual output is different from the carrier pattern recognized by the device, and hence the peak suppression setting and the setting of the distortion monitoring point can not be properly done in some cases.

Such being the case, it is an object of the present invention to provide a device that properly judges the carrier state.

Means for Solving the Problems

The present invention adopts the following means in order to solve the problems.

Namely, the present invention is a carrier state judging device comprising a multiplexing unit multiplexing a plurality of carrier signals to be inputted in parallel, a plurality of output control units disposed respectively on a plurality of transmission paths through which to flow the plurality of carriers signals inputted to the multiplexing unit and performing ON/OFF control of outputs of the carrier signals inputted to the output control units themselves according to predetermined ON/OFF setting values, a plurality of frequency shift units disposed respectively on the transmission paths for the plurality of carrier signals and giving predetermined frequency shift quantities to the carrier signals inputted to the frequency shift units themselves, a detection unit detecting as to whether or not there is the carrier signal flowing through on each carrier signal transmission path, and a determining unit determining a state of the carrier signals multiplexed by the multiplexing unit on the basis of the ON/OFF setting value with respect to each of the output control units, the frequency shift quantity with respect to each of the frequency shift units and a result of the detection by the detection unit.

According to the present invention, the carrier state can be precisely judged from the carrier ON/OFF setting value, the frequency shift quantity and the existence or non-existence of the carrier signal.

Effects of the Invention

According to the present invention, it is possible to provide the device that properly judges the carrier state.

BRIEF DESCRIPTION OF THE DRAWINGS

FIG. 7 is a diagram showing a carrier pattern in a case where the number of carriers is 4 and a frequency shift quantity is set at an equal interval.

FIG. 12 is a table showing a relationship between the carrier ON/OFF setting, an input amplitude and a carrier output.

DETAILED DESCRIPTION OF THE INVENTION

Best Mode of Carrying Out the Invention

An embodiment of the present invention will hereinafter be described with reference to the drawings. A configuration in the following embodiment is an exemplification, and the present invention is not limited to the configuration in the embodiment.

EMBODIMENT

<Transmitting Device>

Figure 1:
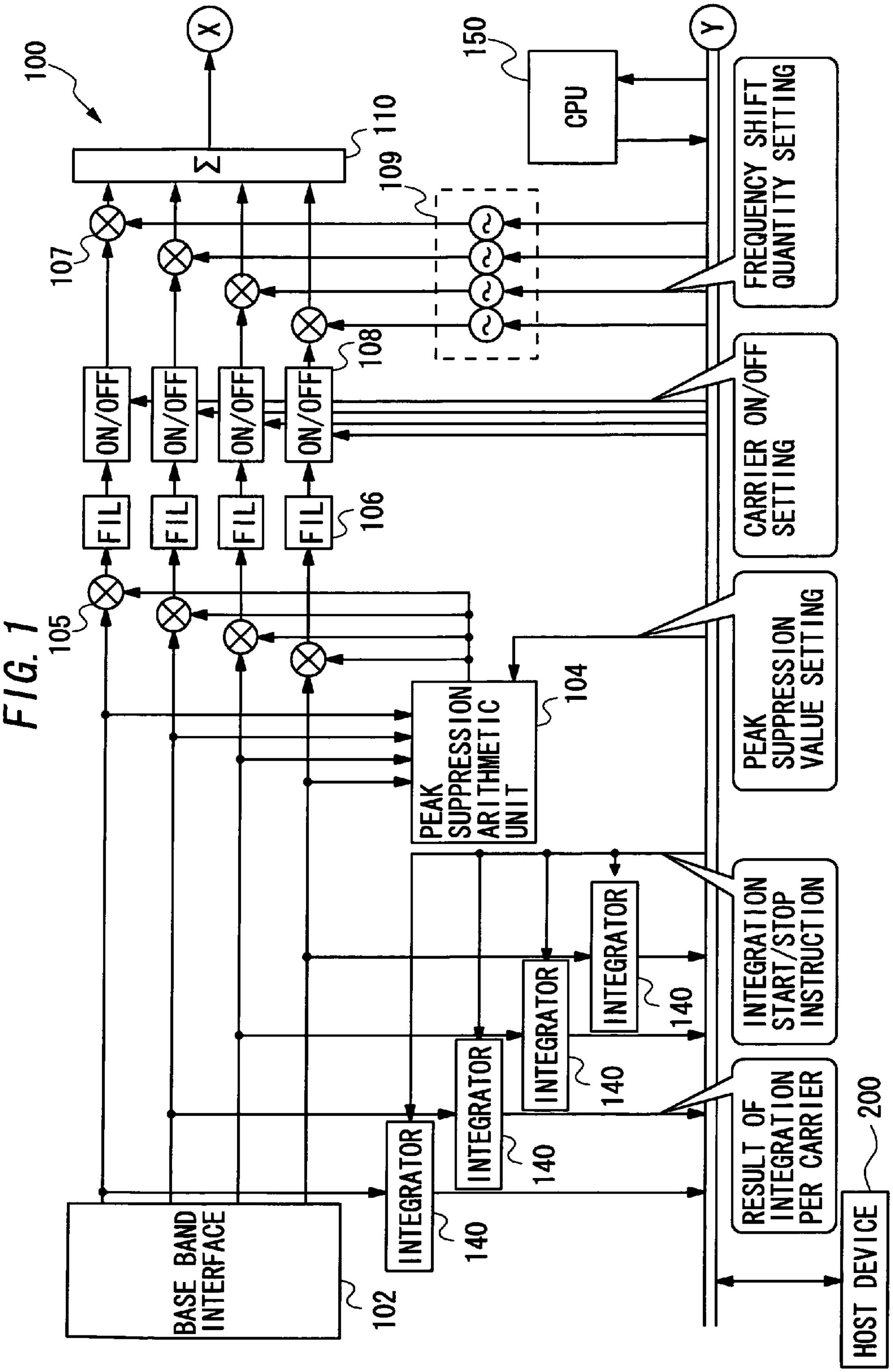
FIG. 1 is a diagram showing an example of an individual carrier processing unit of a transmitting device.
Figure 2:
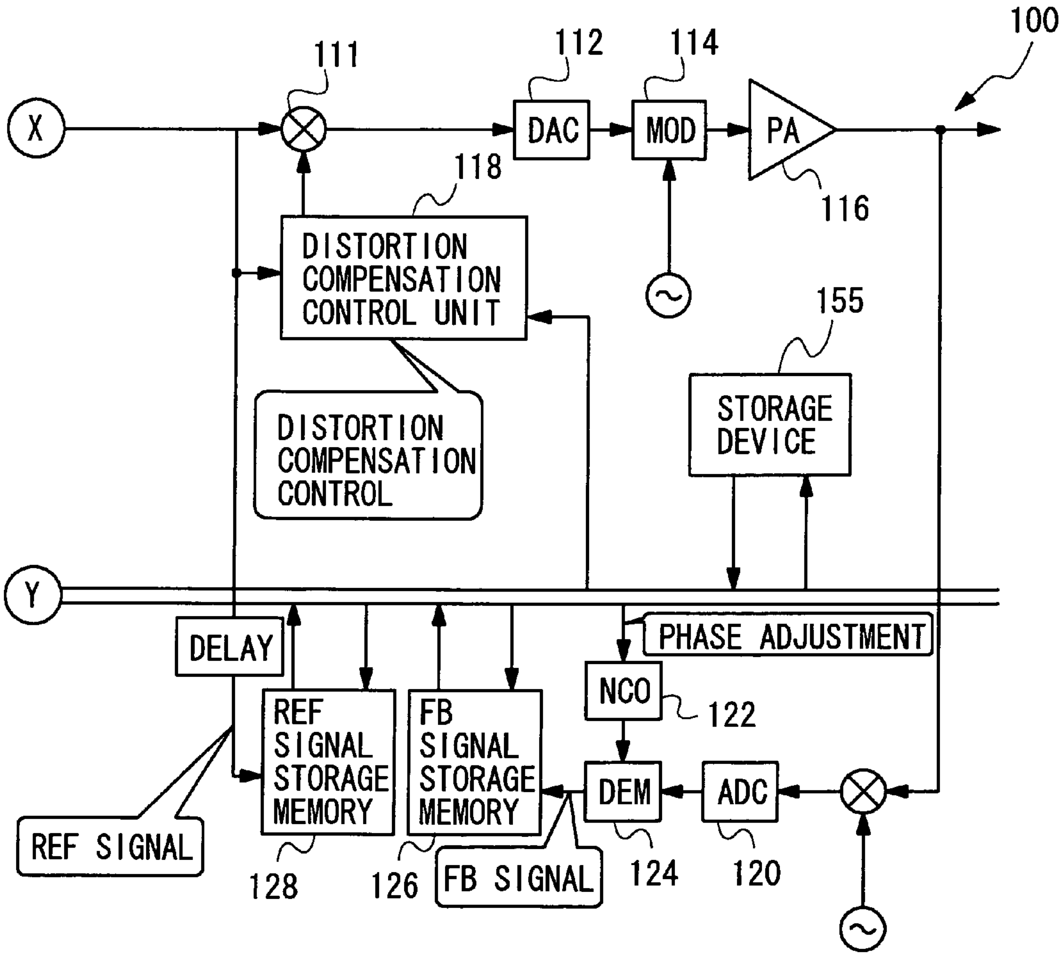
FIG. 2 is a diagram illustrating an example of the transmitting device.

FIGS. 1 and 2 are diagrams each showing an example of a configuration of a transmitting device having a distortion compensating function according to an embodiment of the present invention. FIGS. 1 and 2 are continuous via [X] and [Y] in the respective drawings. FIG. 1 depicts an individual carrier processing unit of the transmitting device. FIGS. 1 and 2 show a case of providing four transmission carriers. In FIG. 1, an individual carrier processing unit of a transmitting device 100 includes a base band interface 102, a peak suppression arithmetic unit 104, a multiplier 105, a filter 106, a carrier ON/OFF setting unit 108, a multiplier 107, a frequency shift quantity setting unit 109, an adder unit 110 and an integrator 140. Further, the individual carrier processing unit of the transmitting device 100 is controlled by a CPU 150. The transmitting device 100 is connected to a host device 200. In FIG. 2, the transmitting device 100 includes a multiplier 111, a distortion compensation control unit 118, a digital/analog converter (DAC) 112, a modulator (MOD) 114, a power amplifying unit (PA) 116, an analog/digital converter (ADC) 120, a demodulator (DEM) 124, a numerically controlled oscillator (NCO) 122, an FB signal storage memory 126, a REF signal storage memory 128 and a storage device 155.

The base band interface 102 outputs a code multiplexing signal (a carrier signal), acquired by applying CDMA modulation to the signal, to each carrier signal transmission path. Each carrier signal outputted from the base band interface 102 is multiplied, in the multiplier 105 defined as a peak suppression unit, by a peak suppression value calculated in the peak suppression arithmetic unit 104, and is inputted to the filter 106 in order to undergo waveform-shaping. The peak suppression arithmetic unit 104 predicts what type of peak will occur and calculates the peak suppression value. Further, the signal of each carrier is inputted to the integrator 140.

The integrator 140 integrates the inputted signal for a fixed period of time, and detects as to whether there is an input amplitude or not. The integrator 140, based on an instruction of the CPU 150, starts and stops the integration, while the CPU 150 refers to a result of the integration. Further, it is also possible for the integrator 140 to continue the integration hardwarewise and for the CPU 150 to refer to the result of the integration as the necessity may arise.

The signal, which is waveform-shaped by the filter 106, is inputted to the carrier ON/OFF setting unit 108. The carrier ON/OFF setting unit 108 controls, based on an ON/OFF setting value of the carrier signal, an ON/OFF state of an output of the carrier signal to be inputted to the carrier ON/OFF setting unit 108 itself. To be specific, if the ON/OFF setting value shows "ON", the inputted carrier signal is outputted as it is. If the ON/OFF setting value shows "OFF", the inputted carrier signal is not outputted. The carrier signal outputted from the carrier ON/OFF setting unit 108 is shifted, in the multiplier 107 defined as a frequency shifting unit, from a base band frequency by a frequency shift quantity that is preset per carrier, and is inputted to the adder unit (multiplexing unit) 110. The adder unit 110 adds (multiplexes) the signals of the respective carriers and outputs the multiplexed signal.

The signal (multiplexed signal) outputted from the adder unit 110 is multiplied in the multiplier 111 by a distortion compensation value calculated in the distortion compensation control unit 118, and is inputted to the DAC 112. The DAC 112 converts the inputted digital signal into an analog signal.

The analog signal converted by the DAC 112 is modulated by the MOD 114 into a transmission frequency.

The PA 116 amplifies the signal modulated into the transmission frequency. The signal thereof is outputted from an antenna (unillustrated).

Further, the signal outputted from the PA 116 is down-converted from the transmission frequency in order to undergo distortion-monitoring. The down-converted signal is converted by the ADC 120 into the digital signal from the analog signal. The signal converted into the digital signal is demodulated by the DEM 124 by use of the signal given from the NCO 122, and is stored as an FB (feedback) signal in the FB signal storage memory 126. Further, the signal outputted from the adder unit 110 described above is stored as a REF (reference) signal in the REF signal storage memory 128.

The distortion compensation control unit 118 monitors the distortion by performing fast Fourier transform (FFT) on the basis of the fixed-period signals stored in the FB signal storage memory 126 and in the REF signal storage memory 128, and calculates the distortion compensation value that takes account of the distortion in the PA 116. The multiplier 111 multiplies this distortion compensation value by the signal before being amplified by the PA 116, thereby making it possible to suppress the occurrence of the distortion of the signal to be outputted.

The storage device 155 is stored with the result of the integration by the integrator 140, a carrier pattern table and so on.

<Host Device>

The transmitting device 100 acquires the above-mentioned ON/OFF setting value and frequency shift quantity from the host device 200.

Figure 3:
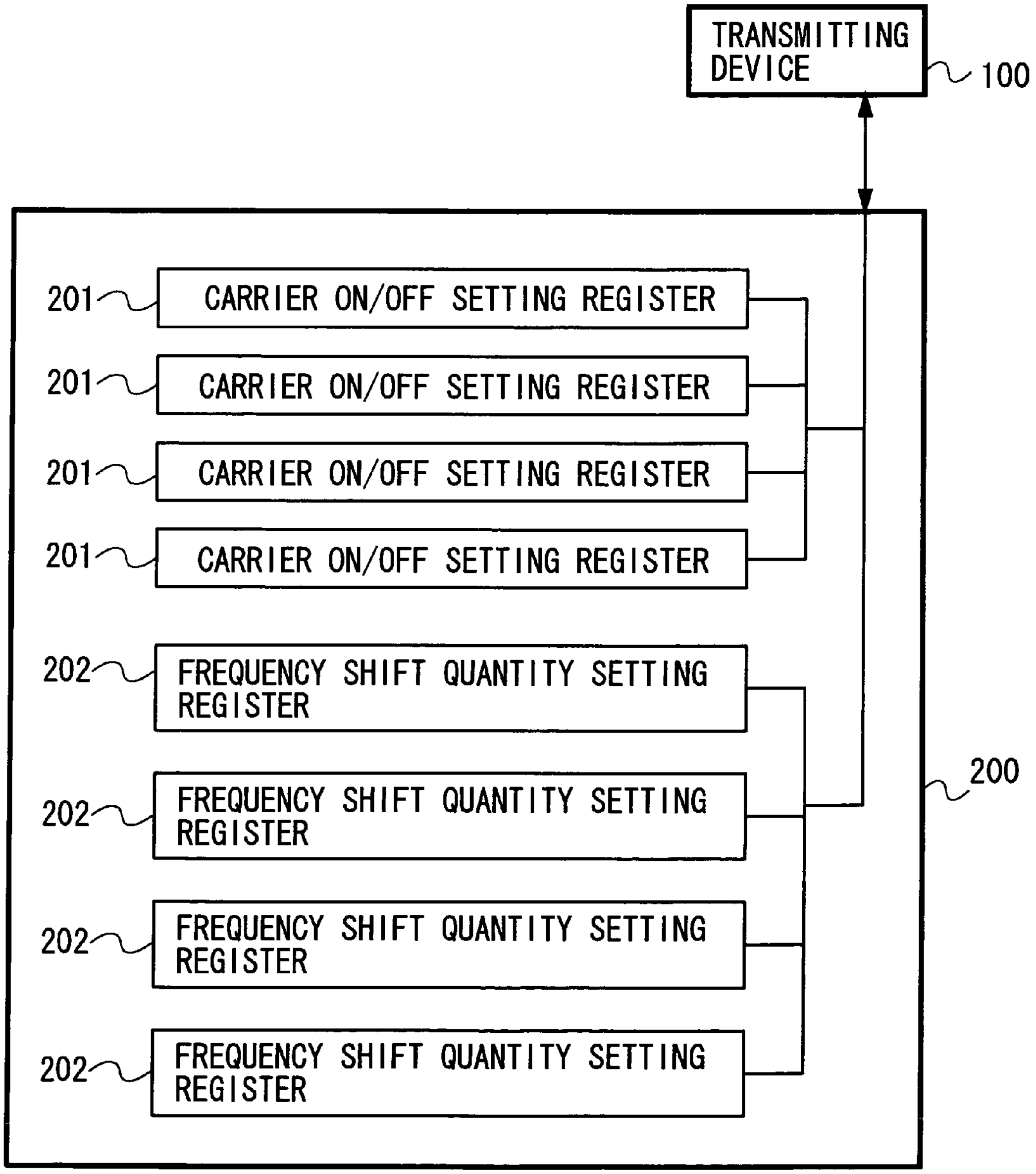
FIG. 3 is a diagram showing a carrier ON/OFF setting register and a frequency shift quantity setting register of a host device connected to the transmitting device.

FIG. 3 is a diagram showing an example of the host device 200 connected to the transmitting device 100.

The host device 200 includes a carrier ON/OFF setting register 201 for each carrier and a frequency shift quantity setting register 202 for each carrier.

The carrier ON/OFF setting register 201 is stored with ON/OFF information of the carrier output per carrier that is set by the host device 200. The carrier ON/OFF setting unit 108 of the transmitting device 100 sets as to whether or not the signal of each carrier is outputted based on this item of information.

The frequency shift quantity setting register 202 is stored with frequency shift quantity setting information per carrier, which is set by the host device 200. The frequency shift quantity of each carrier is set based on this item of information.

The information in the carrier ON/OFF setting register 201 and the information in the frequency shift quantity setting register 202 of the host device 200, can be referred to from the transmitting device 100. These items of information are used for changing peak suppression setting and a distortion monitoring point of the distortion compensation.

<Carrier Allocation and Frequency Shift>

Figure 4:
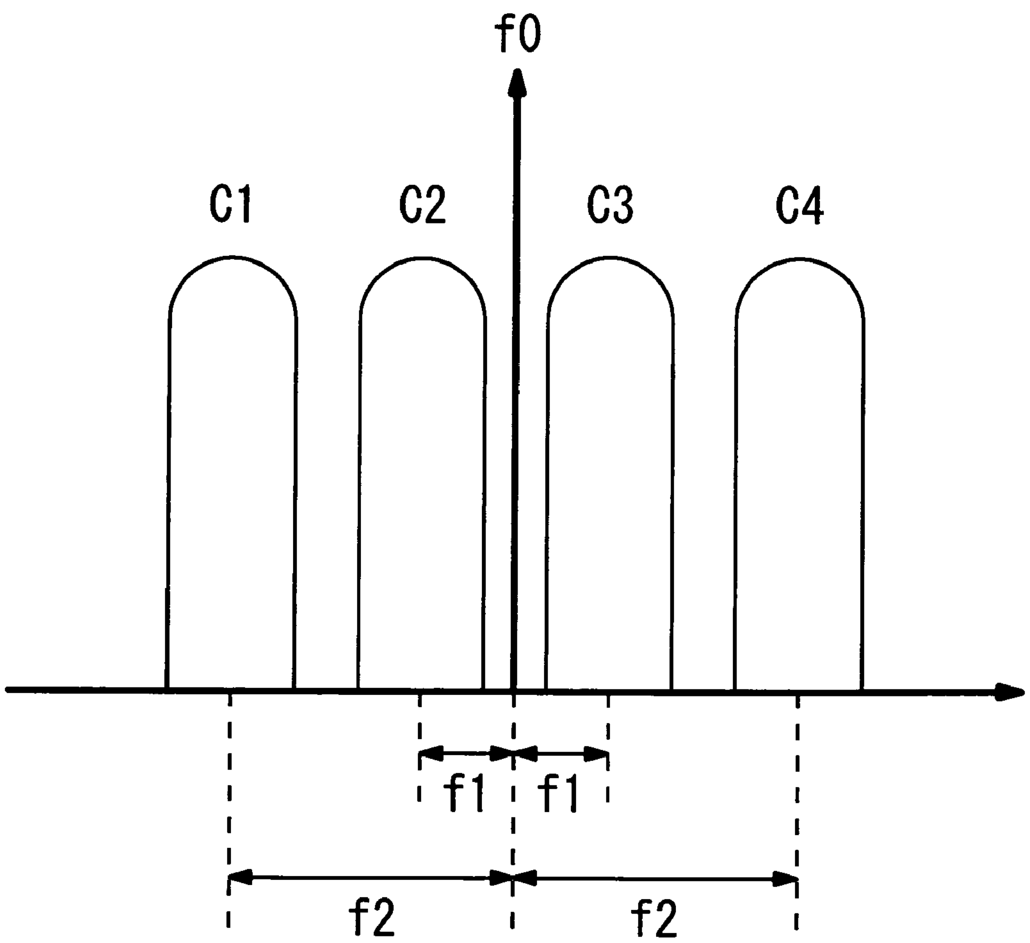
FIG. 4 is a diagram showing an example of carrier allocation and frequency shift quantity setting.
Figure 5:
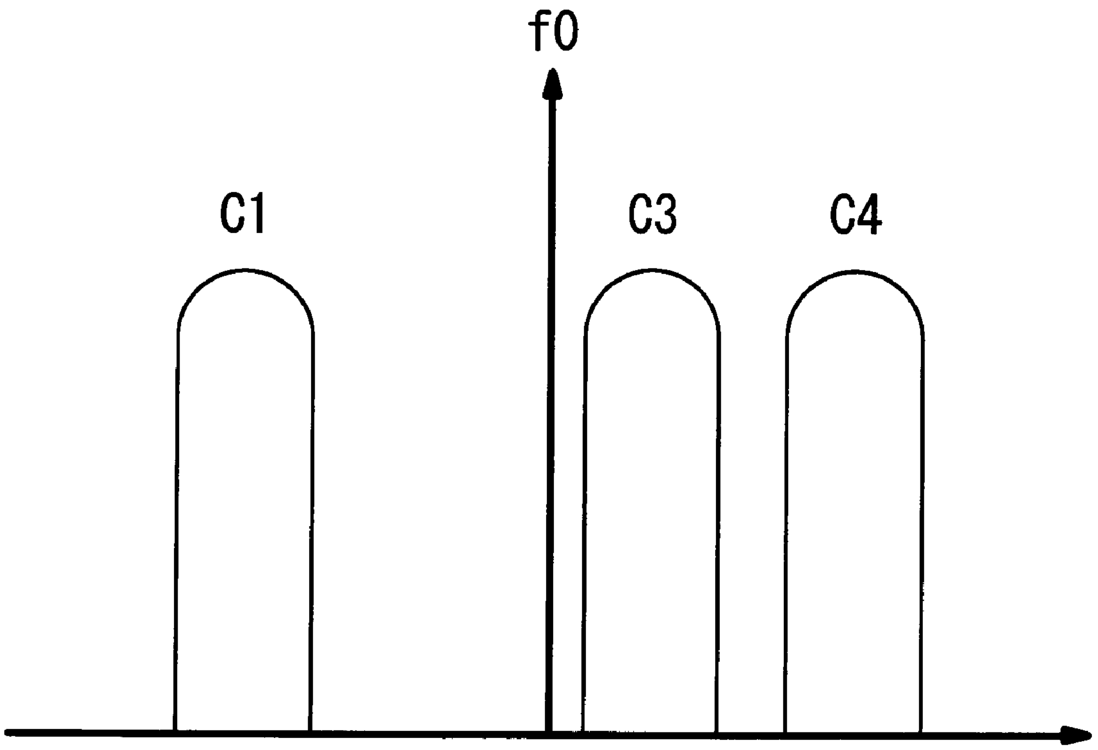
FIG. 5 is a diagram illustrating the example of the carrier allocation and the frequency shift quantity setting.

FIGS. 4 and 5 are diagrams each showing an example of carrier allocation and a frequency shift in a case where the number of carriers (a carrier count) is 4. The axis of abscissa represents the frequency shift quantity, while the axis of ordinates represents the output.

FIG. 4 illustrates an example of output waveforms when the ON/OFF setting values of all the carriers show the "ON" state and when the frequency shift quantity of the first carrier (C1) is −f2, the frequency shift quantity of the second carrier (C2) is −f1, the frequency shift quantity of the third carrier (C3) is +f1, and the frequency shift quantity of the fourth carrier (C4) is +f2. When a band of the carrier is 5 MHz, f1 is set at 2.5 MHz, and f2 is set at 7.5 MHz.

FIG. 5 illustrates an example of the output waveforms when the ON/OFF setting values of the carriers excluding the second carrier (C2) show the "ON" state and when the frequency shift quantity of the first carrier (C1) is −f2, the frequency shift quantity of the third carrier (C3) is +f1, and the frequency shift quantity of the fourth carrier (C4) is +f2.

Figure 6:
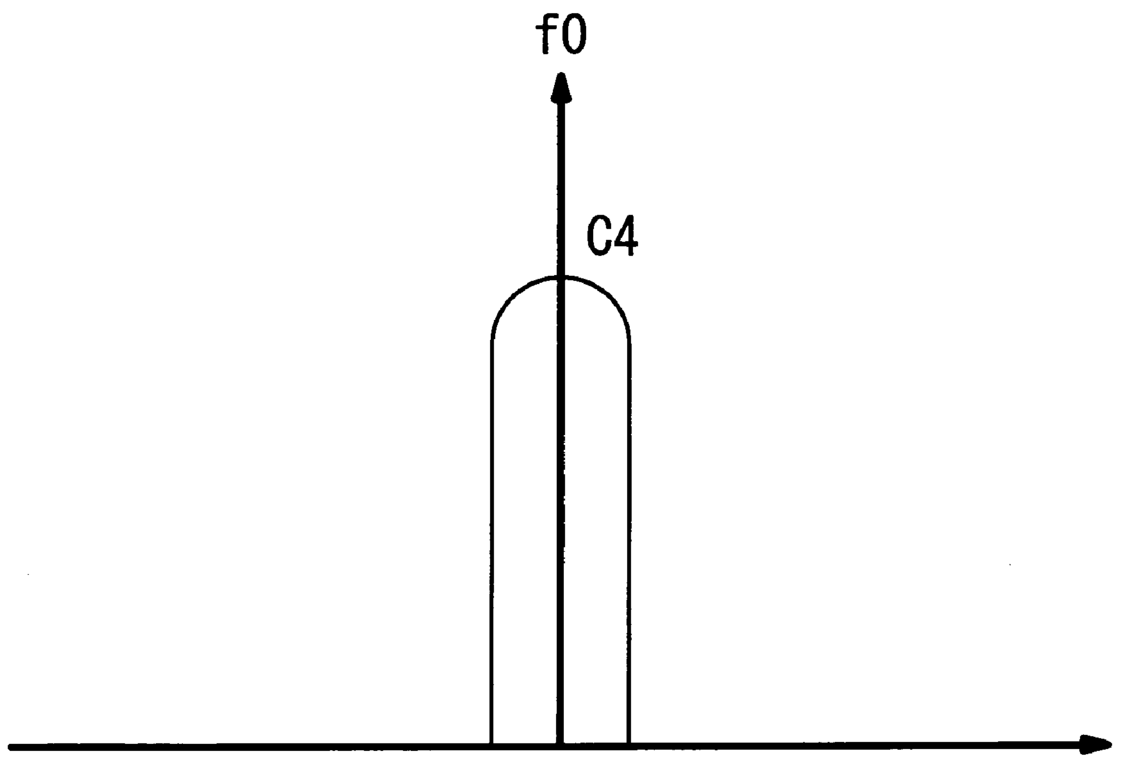
FIG. 6 is a diagram illustrating the example of the carrier allocation and the frequency shift quantity setting.

Further, FIG. 6 illustrates an example of the output waveform when the ON/OFF setting value of only the fourth carrier (C4) shows the "ON" state while the ON/OFF setting values of other carriers show the "OFF" state and when the frequency shift quantity of the fourth carrier is set to 0. The first through third carriers are "OFF" in their ON/OFF setting values and therefore have no output, and only the waveform of the fourth carrier is outputted.

<Carrier Pattern>

FIG. 7 is a table showing carrier patterns in a case where the frequency shift quantities are set at an equal interval. To be specific, it is assumed that the frequency shift quantities of C1, C2, C3 and C4 are set to −f2, −f1, +f1 and +f2, respectively. When the carrier band is 5 MHz, for example, f1 is set at 2.5 MHz, and f2 is set at 7.5 MHz.

When the number of carriers is 4, the following seven patterns can be considered depending on allocation of the carriers.

When the number of effective carriers (that are the carriers of which the ON/OFF setting values indicate "ON") is 4, there is considered only a case (pattern) in which the four carriers are arranged at the equal interval without any spacing.

When the number of effective carriers is 3, there are considered a case (a pattern 2) in which the three carriers are arranged at the equal interval without any spacing and a case (a pattern 3) in which the carriers are arranged with one-carrier spacing.

When the number of effective carriers is 2, there are considered a case (a pattern 4) in which the two carriers are arranged without any spacing, a case (a pattern 5) in which the carriers are arranged with one-carrier spacing and a case (a pattern 6) in which the carriers are arranged with two-carrier spacing.

When the number of effective carrier is 1, there is considered only one pattern (a pattern 1) because of no output from other carriers.

Figure 8:
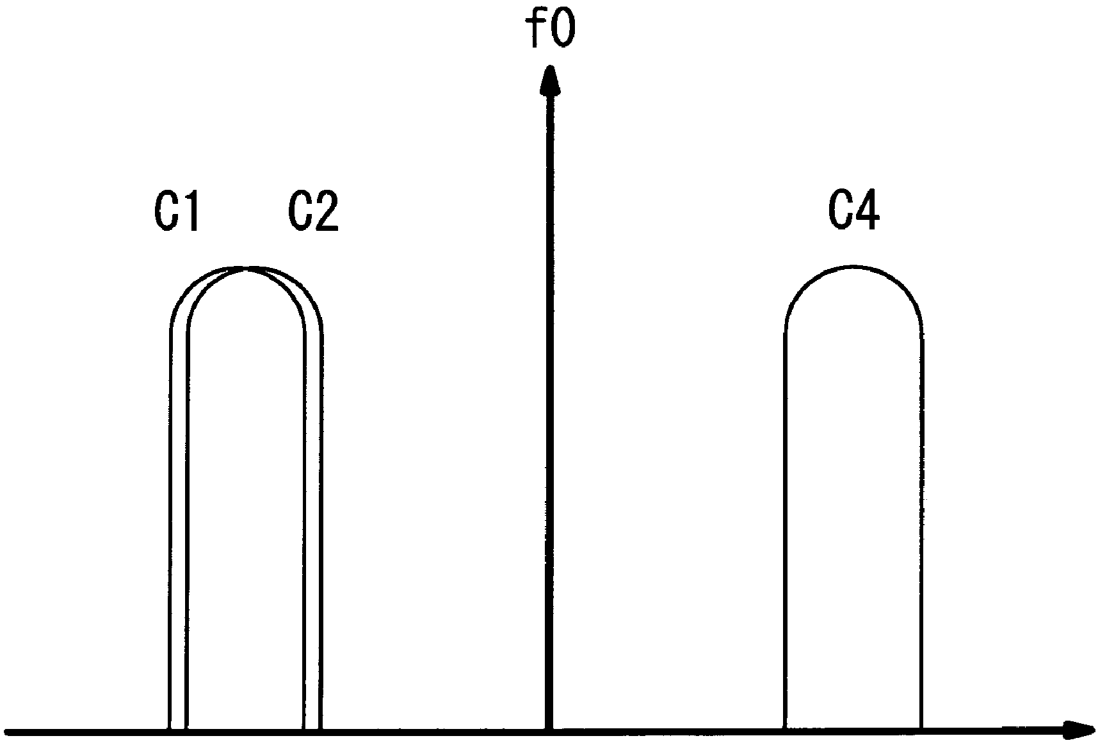
FIG. 8 is a diagram illustrating the example of the carrier allocation and the frequency shift quantity setting.

FIG. 8 is a diagram illustrating a case of setting the same frequency shift quantity with respect to C1 and C2. The example in FIG. 8 is such that the ON/OFF setting values of the carriers other than C3 indicate "ON", the frequency shift quantities of both of C1 and C2 are set to −f2, and the frequency shift quantity of C4 is set to +f2.

At this time, when taking only the ON-OFF setting value of the carrier into consideration, this corresponds to the pattern 3 in FIG. 7 but is deemed to be the pattern 6 because of the same frequency shift quantity with respect to C1 and C2.

Figure 9:
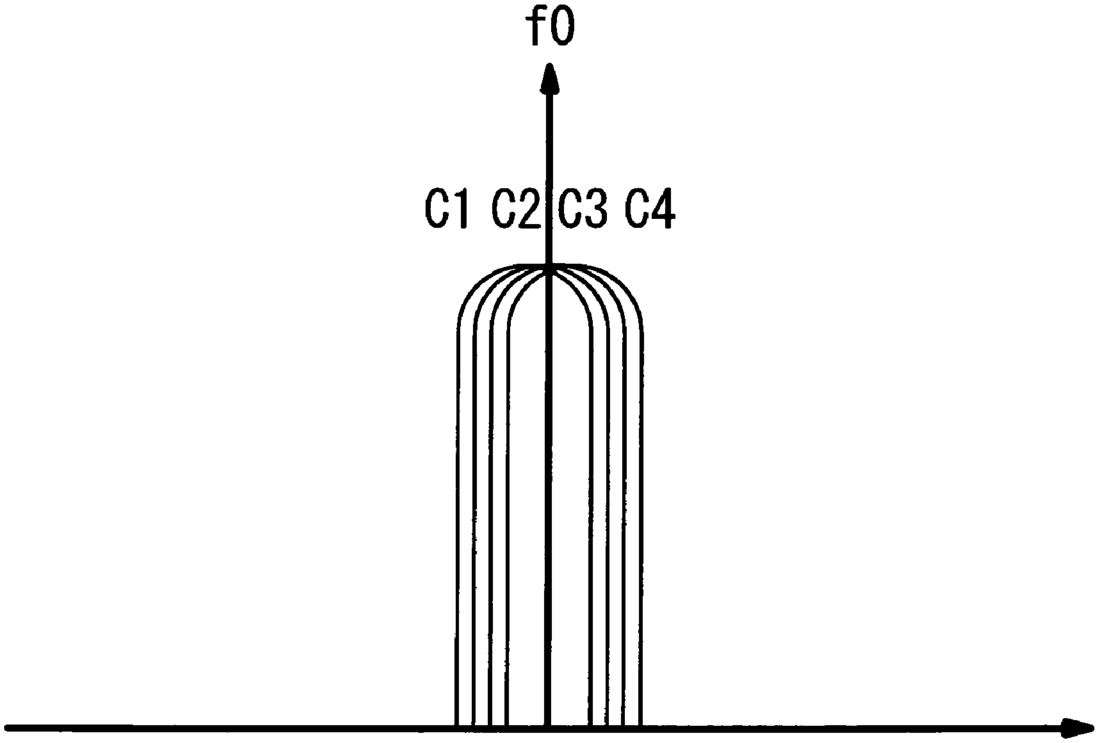
FIG. 9 is a diagram illustrating the example of the carrier allocation and the frequency shift quantity setting.

FIG. 9 is a diagram showing a case of setting the same frequency shift quantity with respect to the four carriers. In the example in FIG. 9, the ON/OFF setting values of all the carriers indicate "ON", and the frequency shift quantities of C1 through C4 are set to 0.

At this time, when taking account of only the ON-OFF setting value of the carrier, this corresponds to the pattern 1 in FIG. 7 but is deemed to be the pattern 7 because of the same frequency shift quantity with respect to all the carriers.

<<Operation Flow>>

Figure 10:
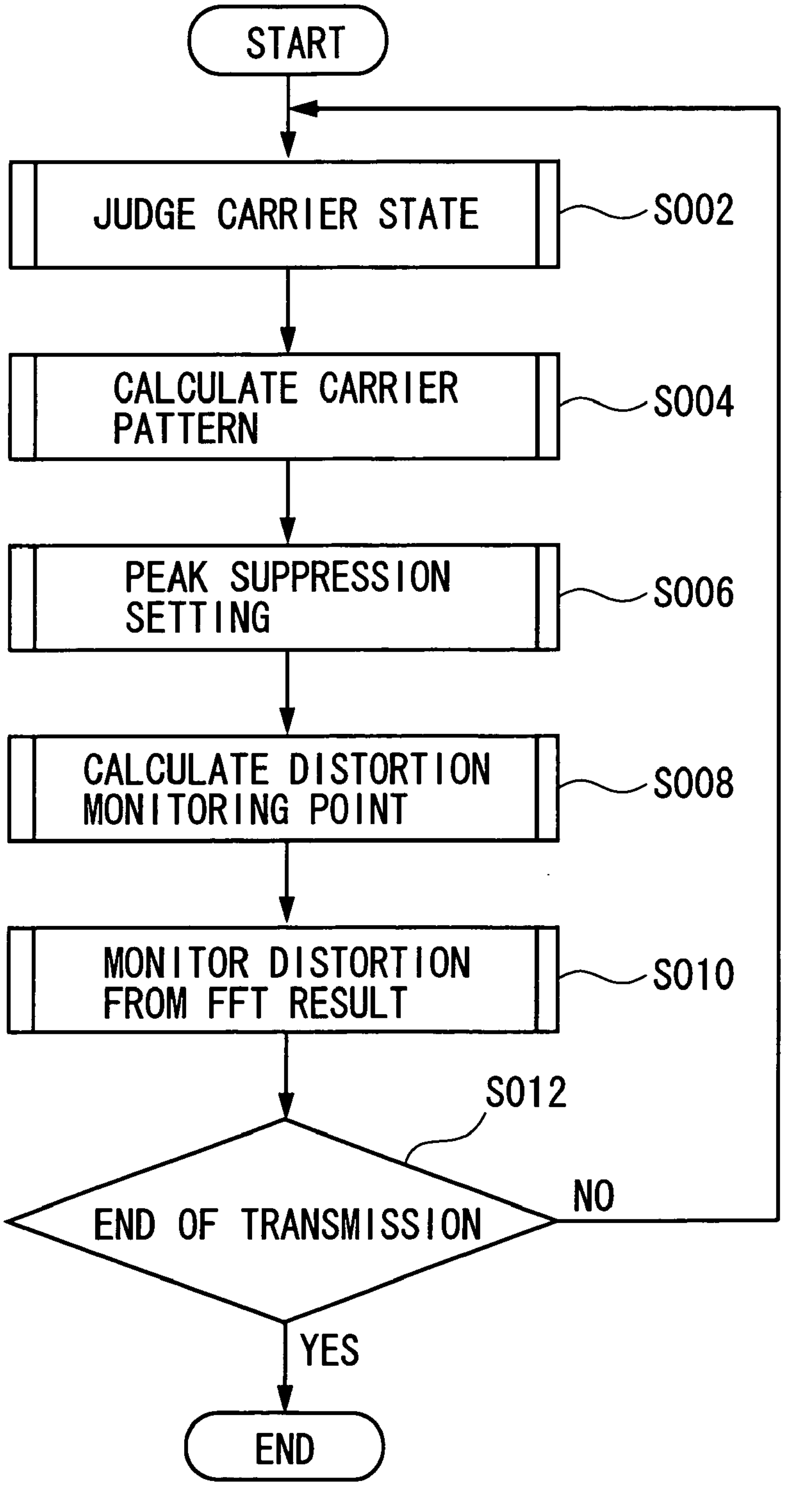
FIG. 10 is a flowchart showing an entire operation flow.

FIG. 10 is a flowchart showing an entire operation flow in judging a carrier status.

When the transmitting device 100 comes to a transmitting status, the CPU 150 judges a carrier state, and thus checks an output carrier state (S002). The CPU 150 of the transmitting device 100, if cable of checking the carrier state, calculates the carrier pattern thereof (S004). The CPU 150 of the transmitting device 100 executes, based on the information on the carrier state, the peak suppression setting (S006), an arithmetic operation of the distortion monitoring point (S008) and the distortion monitoring (S0101).

The peak suppression setting (S006), the distortion monitoring point setting (S008) and the distortion monitoring (S010) may be done irrespective of their order. Namely, the peak suppression setting may be done later on.

When the transmitting status continues (S012; NO), the operation is repeated from the judgment of the carrier state (S002).

<Judgment of Carrier State>

Figure 11:
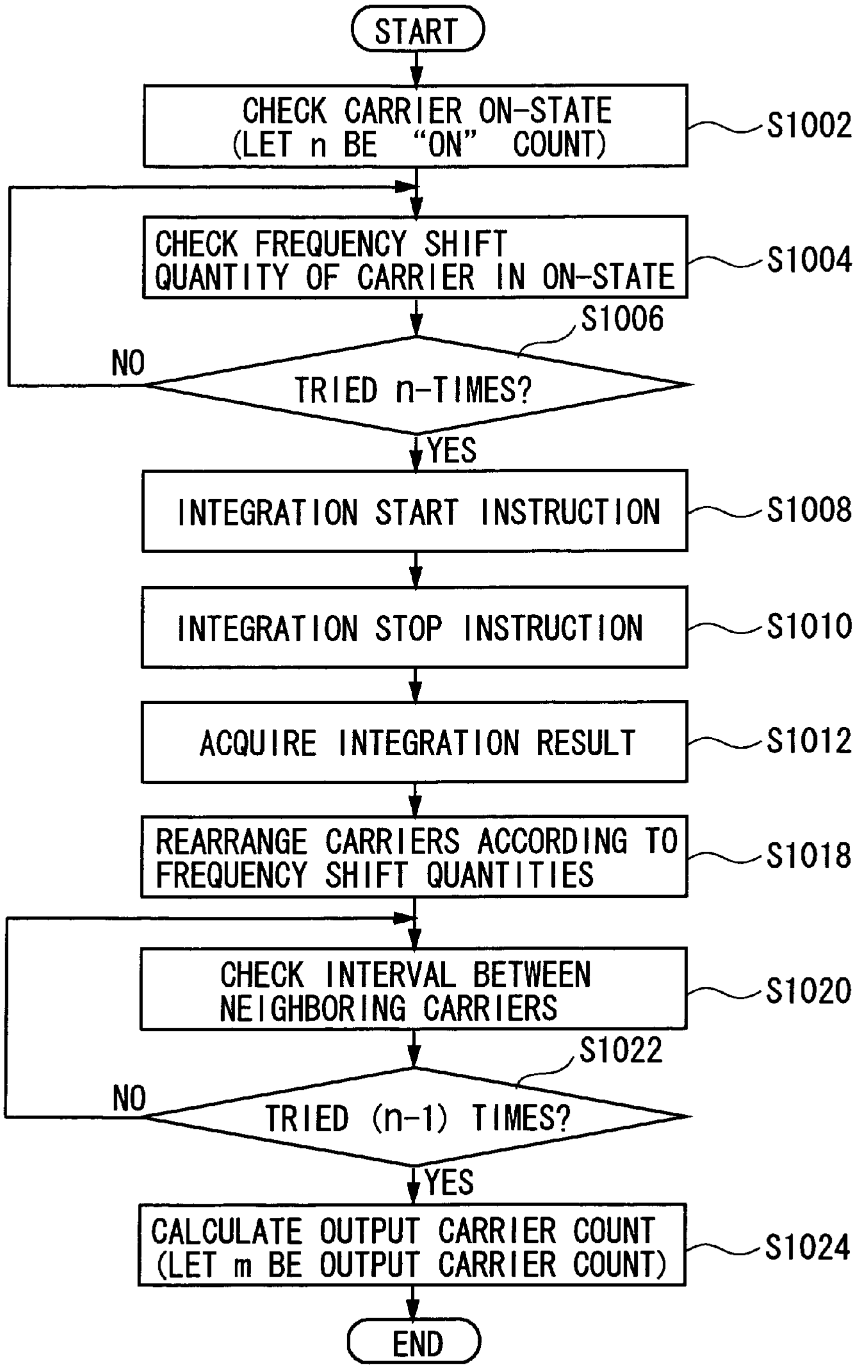
FIG. 11 is a flowchart showing a flow of judging a carrier state.

FIG. 11 is a flowchart showing a flow of judging the carrier state. A case assumed is that the number of carriers is 4, and the carrier band is 5 MHz.

The CPU 150 of the transmitting device 100 checks the ON/OFF setting values of the carriers in the carrier ON/OFF setting register 201 of the host device 200. Herein, let n be the number of carriers exhibiting the ON state (S1002).

The CPU 150 of the transmitting device 100 checks the frequency shift quantities of the carriers showing the ON state in the frequency shift quantity setting register 202 of the host device 200 (S1004). There are n-pieces of carriers exhibiting the ON state, and hence the operation is repeated n-times (S1006).

The CPU 150 of the transmitting device 100 gives an instruction of starting the integration by the integrators 140 connected to the carriers of which the carrier ON/OFF setting values indicate "ON" (S1008). The CPU 150 of the transmitting device 100 gives an instruction of stopping the integration after a fixed period of time (S1010). The CPU 150 of the transmitting device 100 acquires the integration results given by the integrators 140 (S1012). Herein, if the integration result of a certain carrier is 0, it is deemed that there is no input amplitude from this carrier. Further, if the integration result of a certain carrier is larger than 0, it is deemed that the input amplitude is given from this carrier.

It is also possible for the integrator 140 to repeat the integration about all the signals and for the CPU 150 to acquire the integration results as the necessity may arise.

FIG. 12 is a table showing a relationship between the ON/OFF setting value of the carrier, the input amplitude from the base band interface and the carrier output. When the ON/OFF setting value of the carrier indicates "ON" and when there is the input amplitude from the base band interface, it is deemed that the carrier output is given from this carrier. In other cases, it is deemed that none of the carrier output is given from this carrier. Even when the ON/OFF setting value of the carrier indicates "ON" and when there is no input amplitude from the base band interface, it has hitherto been deemed that the carrier output is given. According to the present embodiment, even in the case of thus showing contradiction between the ON/OFF setting value and the input amplitude, it is deemed that there is no carrier output.

The CPU 150 of the transmitting device 100 extracts the carriers of which the ON/OFF setting values indicate "ON" and having the input amplitudes. Herein, let n' be the number of carriers having the input amplitudes. The CPU 150 of the transmitting device 100 rearranges the carriers in the sequence from the lowest (or highest) frequency according to the frequency shift quantities of the respective extracted carriers (S1018). Herein, the frequencies of the respective carriers are designated in the sequence from the lowest such as F(0), . . . , F(n'−1).

The CPU 150 of the transmitting device 100 checks a frequency interval of the neighboring carriers (e.g., F(0) and F(1)) (S1020). The number of carriers is n', and hence the operation is repeated (n'−1) times (S1022).

The CPU 150 of the transmitting device 100 calculates the number of output carriers (S1024). When the carrier frequency interval obtained in the manner described above is less than 2.5 MHz, these carriers are deemed to be one single output carrier. Further, when the carrier frequency interval is equal to or larger than 2.5 MHz, it is deemed that there are two output carriers. Let m be the number of the thus-obtained output carriers.

Figure 18:
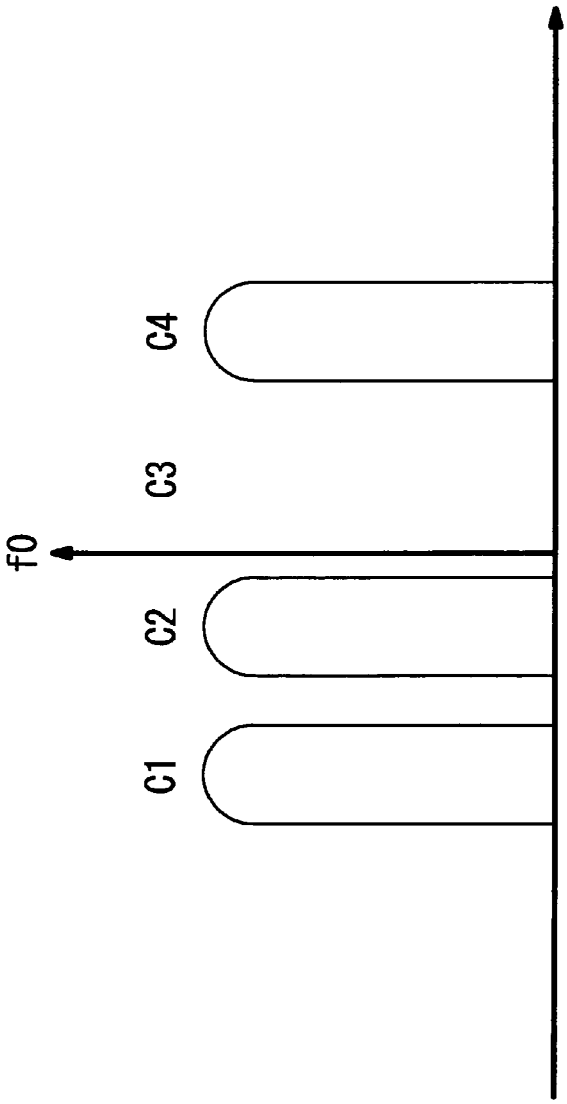
FIG. 18 is a diagram illustrating an example in which the carrier ON/OFF setting is different from an actual output, and also a table showing the carrier ON/OFF setting and the actual output.

FIG. 18 shows a diagram illustrating an example in which the ON/OFF setting values of the carriers are different from the actual outputs, and shows a table of the ON/OFF setting values of the carriers and the actual outputs.

The carrier state has hitherto been judged from the ON/OFF setting value of the carrier and from the frequency shift quantity. Therefore, even in such a case that there is no input amplitude from the base band interface 102, if the ON/OFF setting value of the carrier indicates "ON" (the ON state), it is deemed that there is the output. In the example in FIG. 18, there is no output of C3, and nevertheless it is deemed that there are four carrier outputs.

According to the present embodiment, the integrator 140 detects the input amplitude from the base band interface 102, thereby making it possible to precisely grasp the actual output from the carrier. In the example in FIG. 18, there is none of the output of C3, and hence it is judged that there are three output carriers.

<Calculation of Carrier Patterns>

Figure 13:
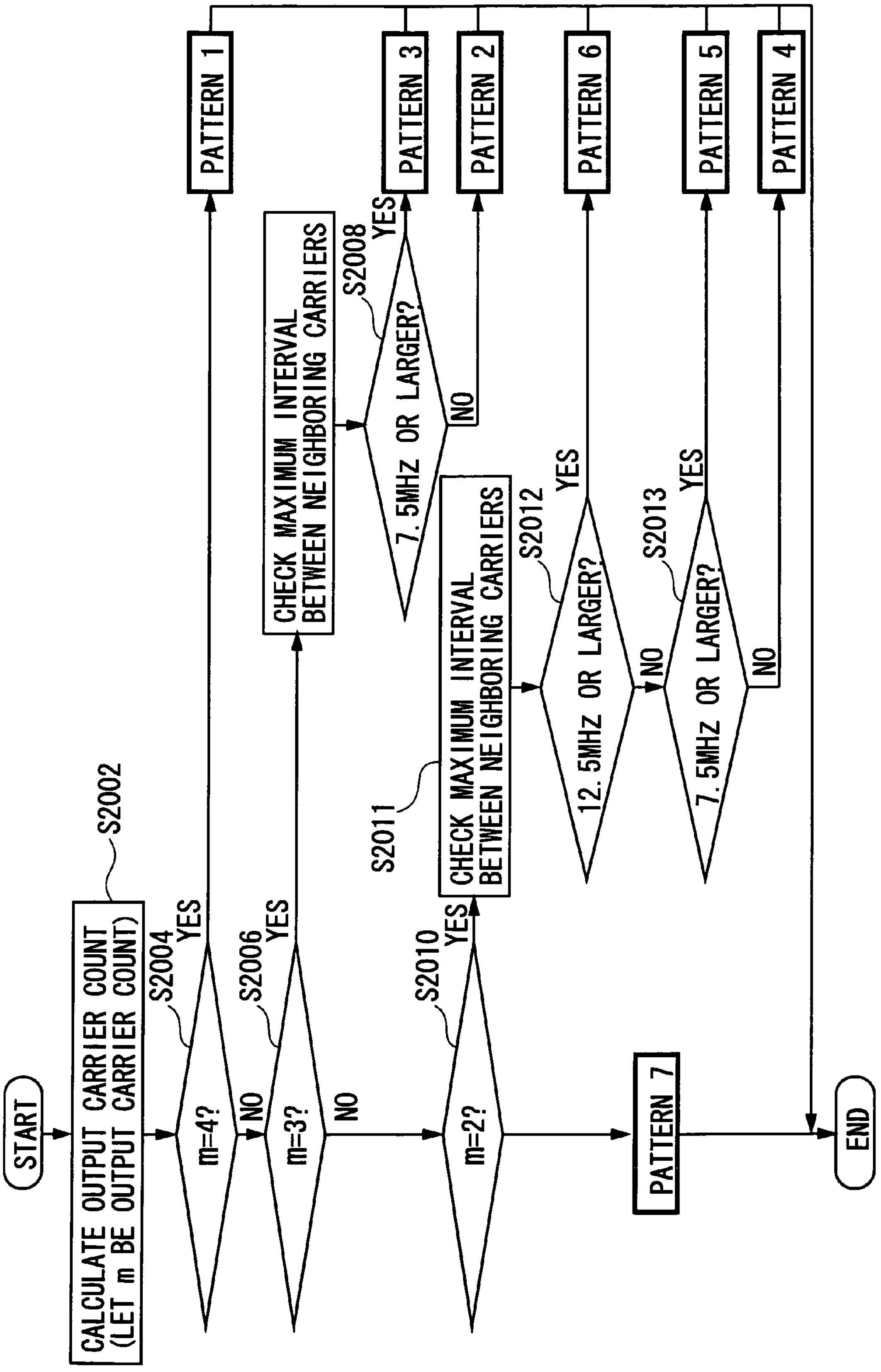
FIG. 13 is a flowchart showing a flow of a carrier pattern calculation method.

FIG. 13 is a flowchart showing a flow of calculating the carrier patterns described above.

The CPU 150 of the transmitting device 100 judges whether m is 4 or not (S2004). When m is 4 (S2004; YES), there are four output carriers, and therefore the carrier pattern is judged to be the pattern 1. Whereas when m is not 4 (S2004; NO), the CPU 150 advances to step S2006.

The CPU 150 of the transmitting device 100 judges whether m is 3 or not (S2006). When m is 3 (S2006; YES), the CPU 150 advances to step S2005. Whereas when m is not 3 (S2006; NO), the CPU 150 advances to step S2008.

When m is 3 (S2006; YES), the CPU 150 of the transmitting device 100 checks a frequency interval between the neighboring carriers (S2007). When the number of all the carriers is 4, the CPU 150 may check the maximum frequency interval. When the maximum frequency interval is equal to or larger than 7.5 MHz (S2008; YES), it is deemed that the carriers are spaced by one carrier away from each other, and the carrier pattern is judged to be the pattern 3. Further, when the maximum frequency interval is less than 7.5 MHz (S2008; NO), it is deemed that the carriers have no spacing from each other, and the carrier pattern is judged to be the pattern 2.

The CPU 150 of the transmitting device 100 judges whether m is 2 or not (S2010). When m is not 2 (S2010; NO), it follows that m is 1, and hence the carrier pattern is judged to be the pattern 7. When m is 2, the CPU 150 advances to step S2011.

When m is 2 (S2010; YES), the CPU 150 of the transmitting device 100 checks the frequency interval between the neighboring carriers (S2011). When the number of all the carriers is 4, the CPU 150 may check the maximum frequency interval. When the maximum frequency interval is equal to or larger than 12.5 MHz (S2012; YES), it is deemed that the carriers are spaced by two carriers away from each other, the carrier pattern is judged to be the pattern 6. Further, when the maximum frequency interval is equal to or larger than 7.5 MHz (S2013; YES), it is deemed that the carriers are spaced by one carrier away from each other, and the carrier pattern is judged to be the pattern 5. Further, when the maximum frequency interval is less than 7.5 MHz (S2013; NO), it is deemed that the carriers have no spacing from each other, and the carrier pattern is judged to be the pattern 4.

<Peak Suppression Setting>

It is desirable that a PAR (Peak-to-Average power Ratio) of the signal transmitted from an antenna be kept to a fixed value (on the order of 7 dB). This is because, if the PAR is too small, a trouble occurs on such an occasion that a receiver demodulates the signal, and, if the PAR is too large, this might cause distortion of the signal. A value of the average power depends on the number of output carriers. If the number of output carriers increases, the value of the average power rises. When there is the carrier of which the ON/OFF setting value shows the ON state in spite of no signal being outputted, if a peak suppression setting value is determined from information on the ON/OFF setting value of the carrier, it follows that an excessive peak is suppressed. Accordingly, it is of importance in terms of determining the peak suppression setting value to correctly grasp the output state of the carrier.

The peak suppression arithmetic unit 104 determines the peak suppression setting value from the number of output carriers. If the number of output carriers is large, the peak is greatly suppressed. The proper peak suppression setting value can be set by correctly grasping the number of output carriers.

<Calculation of Distortion Monitoring Point>

Figure 14:
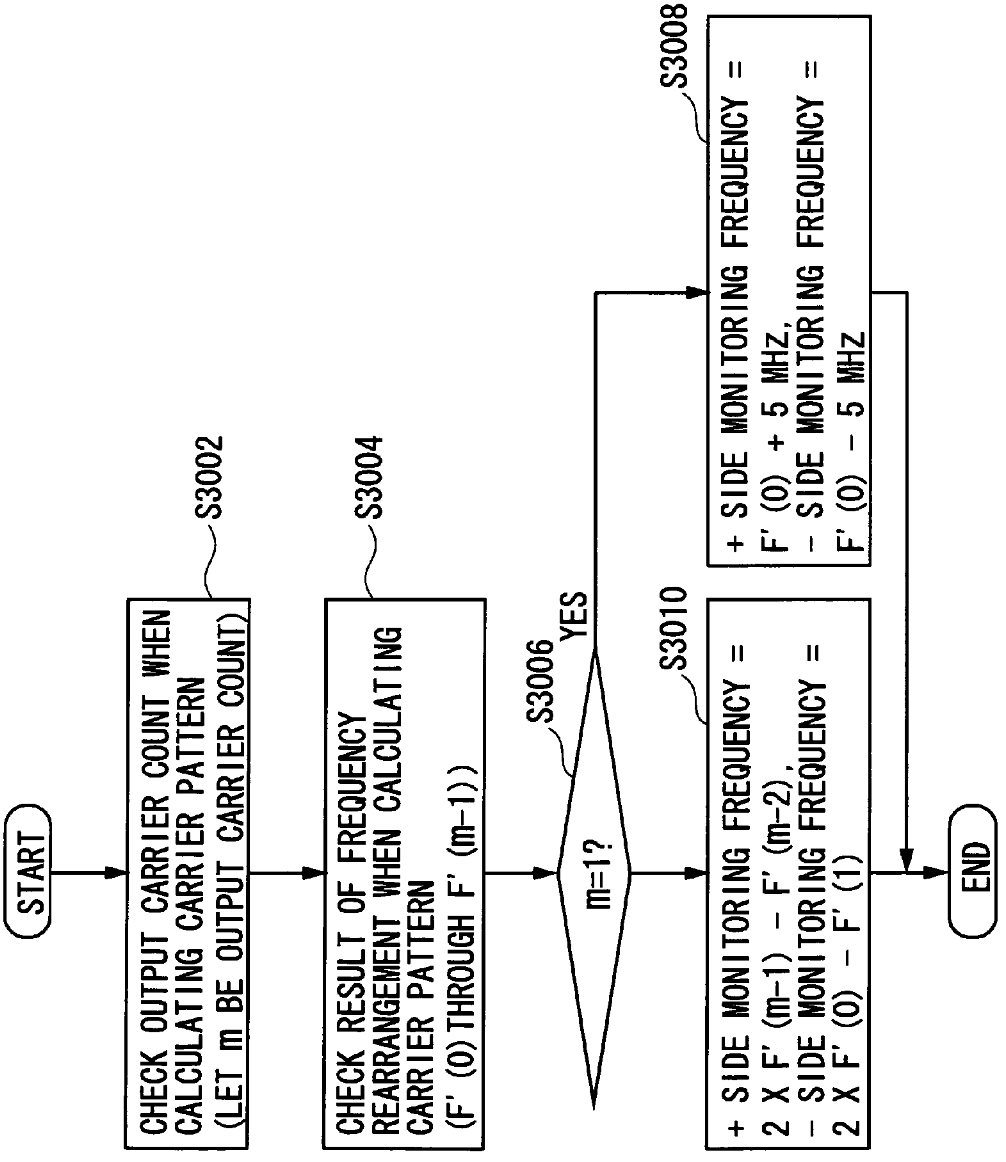
FIG. 14 is a flowchart showing a flow of a distortion monitoring point calculation method.

FIG. 14 is a flowchart showing a flow of how the distortion monitoring point is calculated. The distortion might occur in an off-band adjacent channel, depending on performance of the power amplifying unit. A point where the distortion occurs depends on the carrier state. Such being the case, the distortion monitoring point for monitoring a tertiary distortion occurrence point is calculated from the carrier state.

The CPU 150 of the transmitting device 100 checks the number of output carriers when calculating the carrier pattern (S3002). Let m be the number of output carriers.

The CPU 150 of the transmitting device 100 checks a result of rearranging the frequencies (F(0) through F(n−1)) when calculating the carrier patterns. Among the frequencies F(0) through F(n−1), the frequencies after removing one of the duplicated frequencies are arranged in the sequence from the lowest and then designated such as F'(0) through F'(m−1) (S3004).

The CPU 150 of the transmitting device 100 judges whether the output carrier count (the number of output carriers) m is 1 or not (S3006). When the output carrier count m is 1 (S3006; YES), the distortion monitoring point is set at F'(0)+5 MHz (+side monitoring frequency) and at F'(0)+5 MHz (−side monitoring frequency) (S3008).

Figure 15:
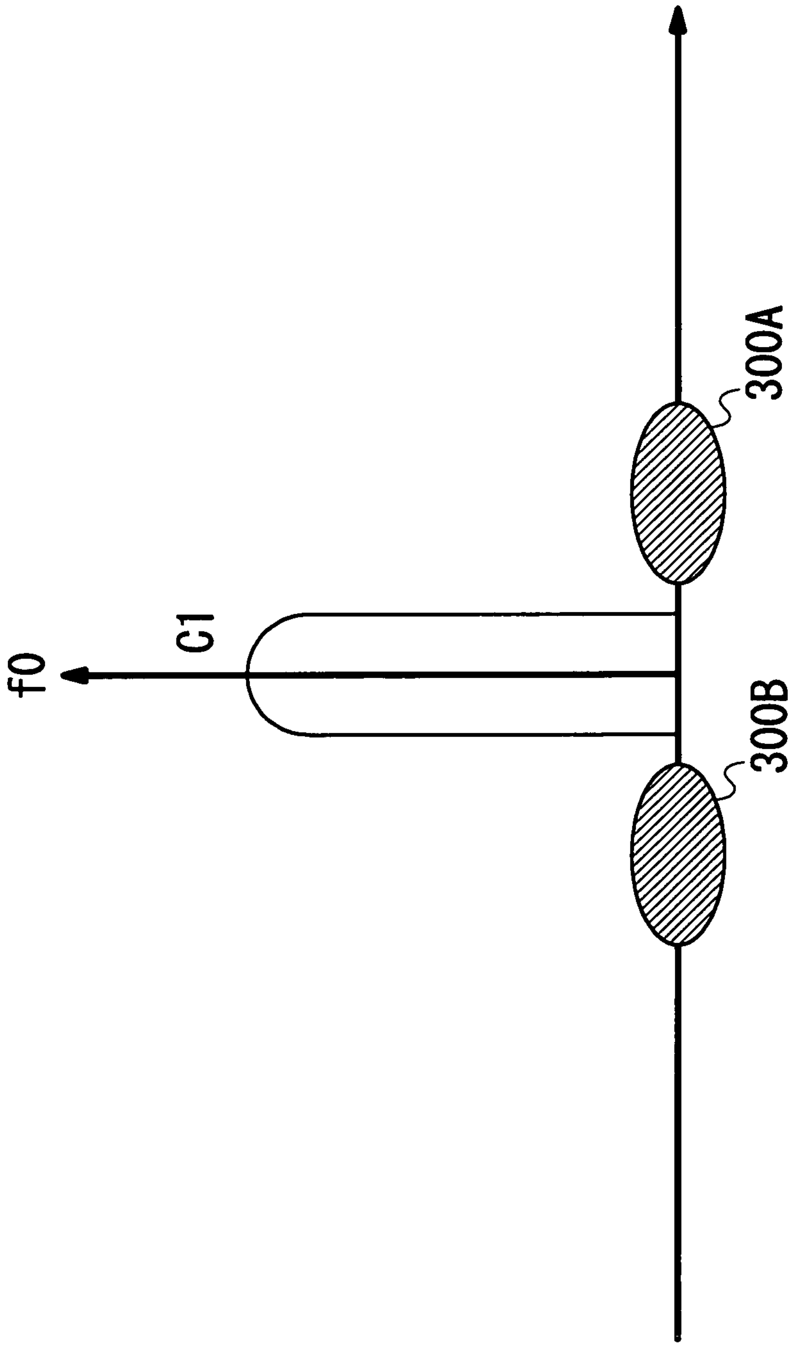
FIG. 15 is a diagram showing an example of the distortion monitoring point of distortion compensation.

FIG. 15 is a diagram showing an example of the distortion monitoring point when the output carrier count m is 1. The distortion monitoring point is set at +5 MHz (+side monitoring frequency, FIG. 15: 300A) from the central frequency and at −5 MHz (−side monitoring frequency, FIG. 15: 300B) from the central frequency. A distortion monitoring range can set covering, e.g., 2.5 MHz anterior and posterior to the distortion monitoring frequency.

The CPU 150 of the transmitting device 100, when the output carrier count m is not 1 (S3006; NO), sets the distortion monitoring point at 2×F'(m−1)−F' (m−2) (+side monitoring frequency) and at 2×F'(0)−F'(1) (−side monitoring frequency) (S3010).

Figure 16:
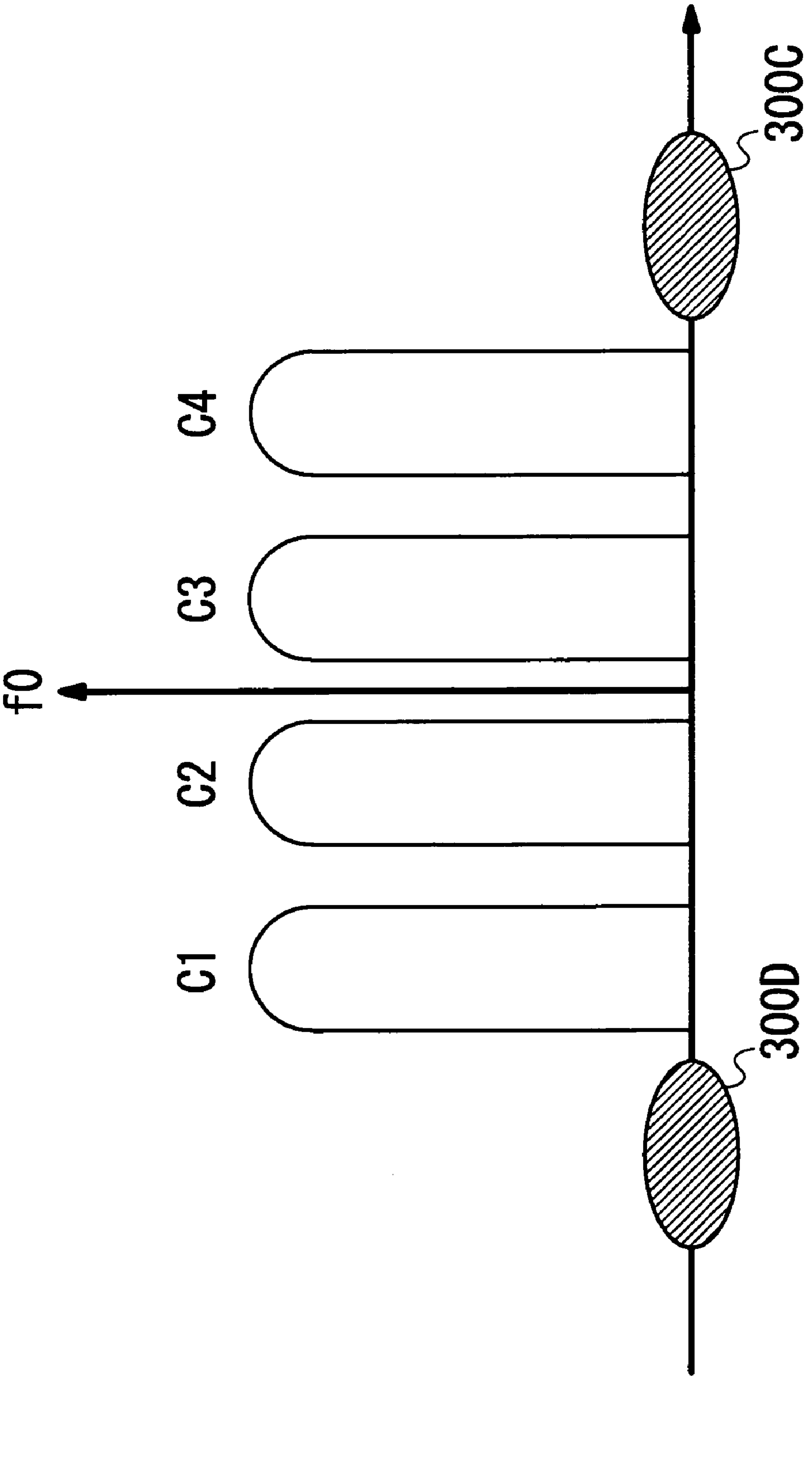
FIG. 16 is a diagram showing an example of the distortion monitoring point of the distortion compensation.

FIG. 16 is a diagram showing an example of the distortion monitoring point when the output carrier count m is 4.

FIG. 16 illustrates the example of the distortion monitoring point when all the carriers are set ON and when the frequency shift quantity of the first carrier (C1) is set to −7.5 MHz, the frequency shift quantity of the second carrier (C2) is set to −2.5 MHz, the frequency shift quantity of the third carrier (C3) is set to +2.5 MHz, and the frequency shift quantity of the fourth carrier (C4) is set to +7.5 MHz. At this time, since the output carrier count m is 4, the distortion monitoring point is set at +12.5 MHz (+side monitoring frequency, FIG. 16: 300C) from the central frequency and at −12.5 MHz (−side monitoring frequency, FIG. 16: 300D) from the central frequency.

Figure 17:
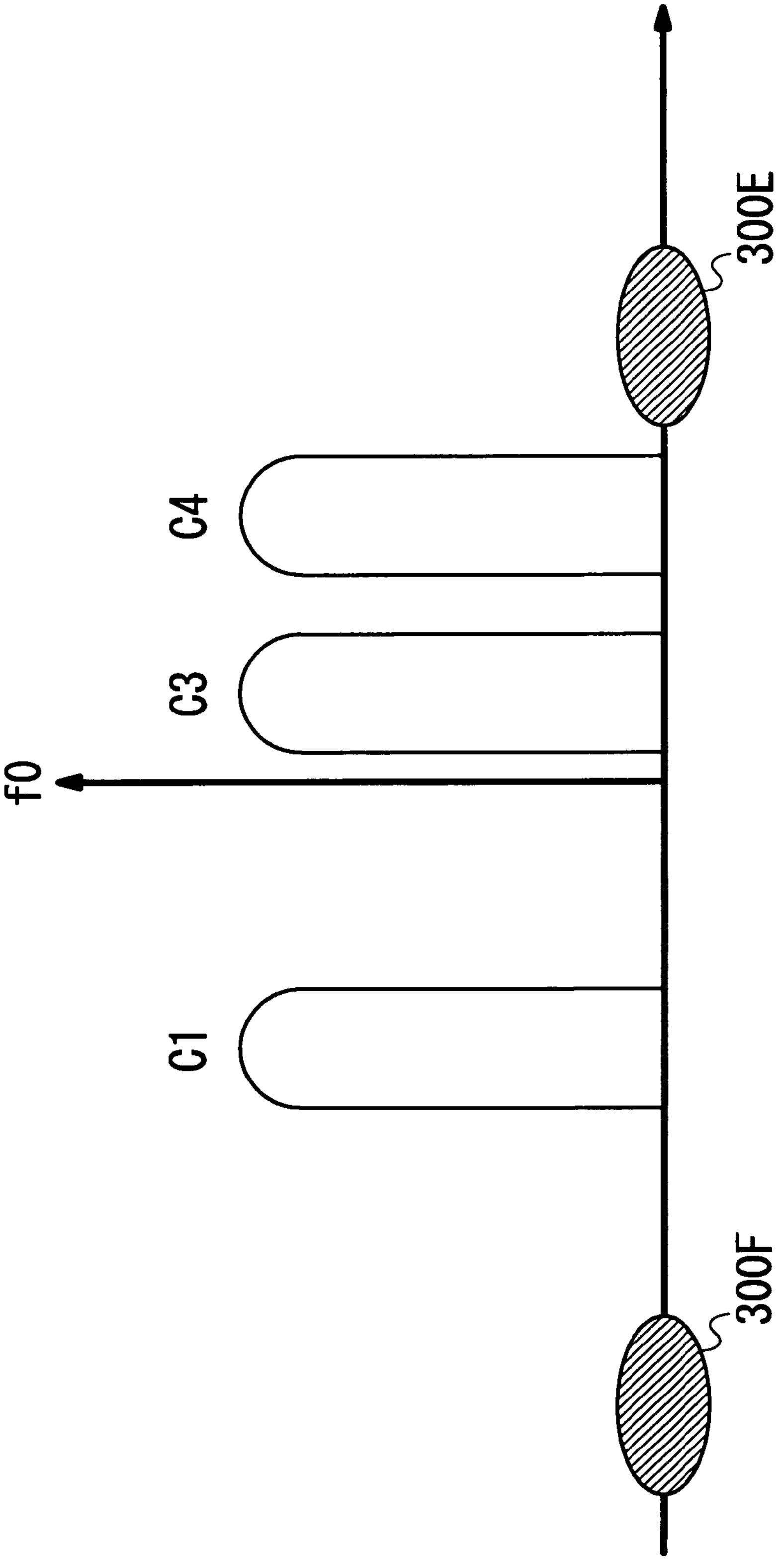
FIG. 17 is a diagram showing an example of the distortion monitoring point of the distortion compensation.

FIG. 17 is a diagram illustrating an example of the distortion monitoring point when the output carrier count m is 3.

FIG. 17 illustrates the example of the distortion monitoring point when the carriers excluding the second carrier are set ON and when the frequency shift quantity of the first carrier (C1) is set to −7.5 MHz, the frequency shift quantity of the third carrier (C3) is set to +2.5 MHz, and the frequency shift quantity of the fourth carrier (C4) is set to +7.5 MHz. At this time, the distortion monitoring point is set at +12.5 MHz (+side monitoring frequency, FIG. 17: 300E) from the central frequency and at −17.5 MHz (−side monitoring frequency, FIG. 17: 300F) from the central frequency.

In these distortion monitoring points, the distortion compensation control unit of the transmitting device executes the distortion monitoring.

The distortion monitoring point can be properly set by precisely judging the carrier state.

MODIFIED EXAMPLE

Figure 19:
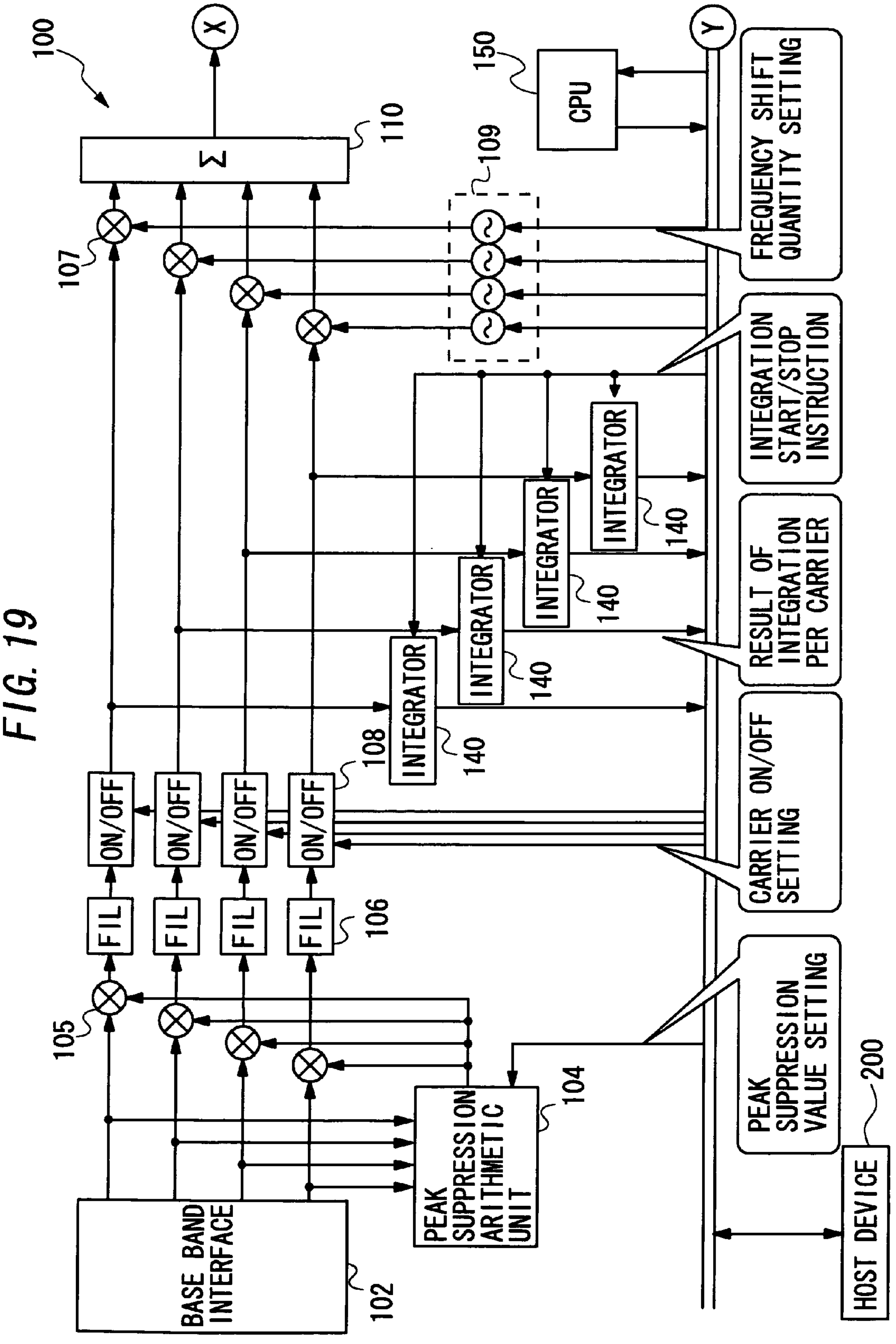
FIG. 19 is a diagram showing an example of the individual carrier processing unit of the transmitting device.
Figure 20:
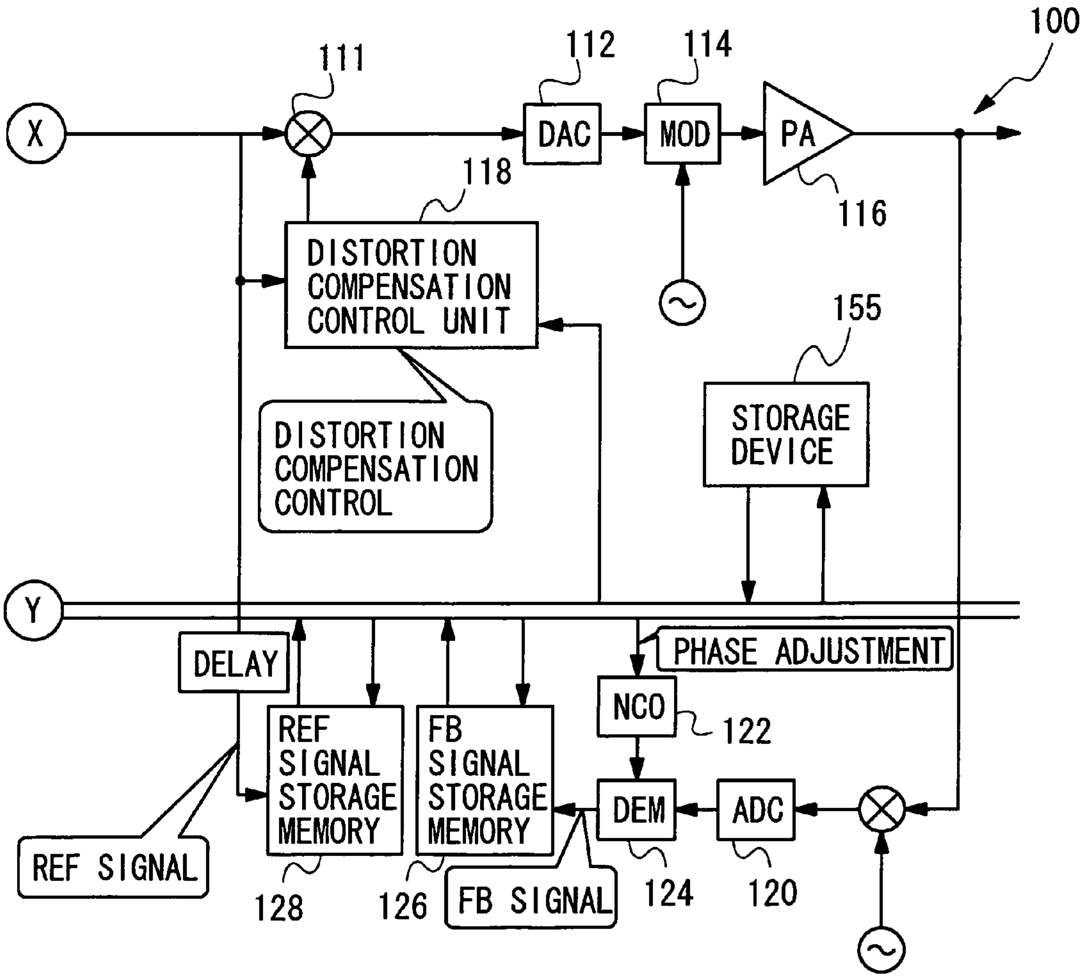
FIG. 20 is a diagram showing the example of the transmitting device.
Figure 21:
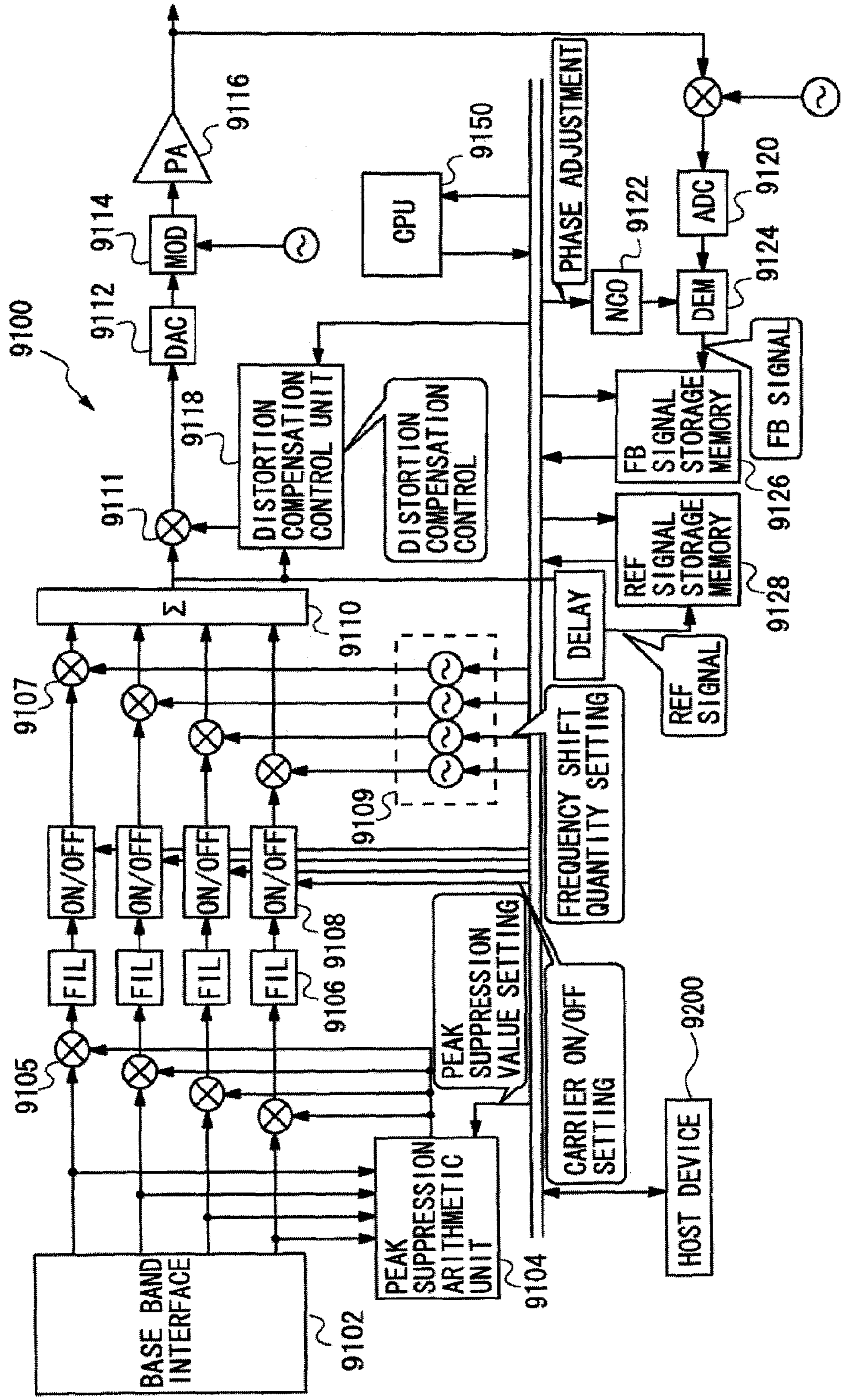
FIG. 21 is a diagram illustrating an example of the transmitting device having a distortion compensating function.

FIGS. 19 and 20 are diagrams each showing a modified example of the transmitting device. FIGS. 19 and 20 are continuous via [X] and [Y] in the respective drawings. FIG. 19 illustrates a modified example of the individual carrier processing unit of the transmitting device. In this modified example, the integrators 140 are disposed posterior to the carrier ON/OFF setting units 108. Other portions are the same as those in the transmitting device in FIGS. 1 and 2. With this configuration, it is possible to acquire, from only the integrator 140, the output carrier information containing both items of information about the input amplitude from the base band interface 102 and the carrier ON/OFF setting value. Hence, the carrier state can be judged from the integration result of the integrator 140 and from the frequency shift quantity. Namely, there is no necessity for obtaining the information on the carrier ON/OFF setting value on the occasion of judging the carrier state, thereby enabling the processing to be simplified.

<Operational Effect in the Embodiment>

According to the transmitting device explained above, the CPU 150, defined as a determining unit, of the transmitting device 100 determines the carrier signal state of the single carrier signal or the plurality of carriers signals, which is multiplexed in the adder unit (multiplexing unit) 110 on the basis of the ON/OFF setting value, the frequency shift quantity and the information (the detection result) about whether or not there are the carrier signals on the respective carrier transmission paths that are obtained from the individual multipliers 140 configuring a detection unit in a way that applies the carrier signals to the carrier patterns. At this time, the carrier signal state can be judged in the way of taking account of the contradiction against the ON/OFF setting value by taking into consideration whether or not there is the input amplitude from the base band interface 102, whereby the accurate carrier signal state can be determined. Then, the multiplexed signal can be properly amplified and transmitted by conducting the distortion compensation and the peak suppression, which involves using the thus-determined carrier signal state. It should be noted that FIGS. 1 and 2 exemplify the transmitting device in which to perform both of the distortion compensation and the peak suppression, however, the transmitting device may also be configured to conduct only one of the distortion compensation and the peak suppression. Namely, in the transmitting device according to the present invention, it is not an indispensable requirement to have the configuration for executing both of the distortion compensation and the peak suppression.

Incorporation by Reference

The disclosures of Japanese patent application No. JP2006-181601 filed on Jun. 30, 2006 including the specification, drawings and abstract are incorporated herein by reference.

What is claimed is:

1. A carrier state judging device comprising:

a multiplexing unit multiplexing a plurality of carrier signals;

a plurality of output control units disposed on transmission paths for the plurality of carriers signals and controlling outputs of the carrier signals inputted to said output control units themselves on the basis of predetermined ON/OFF setting values;

a plurality of frequency shift units disposed respectively on the transmission paths for the plurality of carrier signals and giving predetermined frequency shift quantities to the carrier signals inputted to said frequency shift units themselves;

a detection unit detecting as to whether there is each carrier signal or not; and a determining unit determining a state of the carrier signals multiplexed by said multiplexing unit on the basis of the ON/OFF setting value with respect to each of said output control units, the frequency shift quantity with respect to each of said frequency shift units and a result of the detection by said detection unit.

2. A carrier state judging device according to claim 1, wherein said determining unit judges that, when said detection unit confirms existence of the carrier signals, the carrier signals of which the ON/OFF setting values indicate "ON" are inputted to said multiplexing unit via said frequency shift units, and determines the state of the carrier signal in a way that applies, to a plurality of carrier patterns prepared beforehand, how the plurality of carrier signals inputted to said multiplexing unit is distributed on an axis of frequency according to the frequency shift quantities given to the respective carrier signals.

3. A carrier state judging device according to claim 1, wherein said detection unit includes an integrator that integrates the carrier signal on each of the carrier signal transmission paths.

4. A transmitting device comprising:

a multiplexing unit multiplexing a plurality of carrier signals;

a plurality of output control units disposed on transmission paths for the plurality of carriers signals and controlling outputs of the carrier signals inputted to said output control units themselves on the basis of predetermined ON/OFF setting values;

a plurality of frequency shift units disposed respectively on the transmission paths for the plurality of carrier signals and giving predetermined frequency shift quantities to the carrier signals inputted to said frequency shift units themselves;

a detection unit detecting as to whether there is each carrier signal or not;

a determining unit determining a state of the carrier signals multiplexed by said multiplexing unit on the basis of the ON/OFF setting value with respect to each of said output control units, the frequency shift quantity with respect to each of said frequency shift units and a result of the detection by said detection unit;

a distortion compensating unit conducting distortion compensation about the multiplexed signal outputted from said multiplexing unit on the basis of the carrier signal state determined by said determining unit; and a transmitting unit amplifying and transmitting the multiplexed signal undergoing the distortion compensation.

5. A transmitting device comprising:

a multiplexing unit multiplexing a plurality of carrier signals;

a plurality of output control units disposed on transmission paths for the plurality of carriers signals and controlling outputs of the carrier signals inputted to said output control units themselves on the basis of predetermined ON/OFF setting values;

a plurality of frequency shift units disposed respectively on the transmission paths for the plurality of carrier signals and giving predetermined frequency shift quantities to the carrier signals inputted to said frequency shift units themselves;

a detection unit detecting as to whether there is each carrier signal or not;

a determining unit determining a state of the carrier signals multiplexed by said multiplexing unit on the basis of the ON/OFF setting value with respect to each of said output control units, the frequency shift quantity with respect to each of said frequency shift units and a result of the detection by said detection unit;

a peak suppression unit conducting peak suppression with respect to each carrier signal on the basis of the carrier signal state determined by said determining unit; and a transmitting unit amplifying and transmitting the multiplexed signal.

* * * * *